(12) United States Patent
Ress, Jr.

(10) Patent No.: US 11,187,247 B1
(45) Date of Patent: Nov. 30, 2021

(54) GAS TURBINE ENGINE WITH ACTIVE CLEARANCE CONTROL

(71) Applicant: Florida Turbine Technologies, Inc., Jupiter, FL (US)

(72) Inventor: Robert A. Ress, Jr., Carmel, IN (US)

(73) Assignee: Florida Turbine Technologies, Inc., Jupiter, FL (US)

(*) Notice: Subject to any disclaimer, the term of this patent is extended or adjusted under 35 U.S.C. 154(b) by 0 days.

(21) Appl. No.: 17/325,790

(22) Filed: May 20, 2021

(51) Int. Cl.
| | |
|---|---|
| *F04D 29/16* | (2006.01) |
| *F04D 29/58* | (2006.01) |
| *F04D 29/40* | (2006.01) |
| *F02C 6/20* | (2006.01) |
| *F02C 9/18* | (2006.01) |
| *H05B 3/00* | (2006.01) |
| *F02C 3/04* | (2006.01) |

(52) U.S. Cl.
CPC ............... *F04D 29/584* (2013.01); *F02C 3/04* (2013.01); *F02C 6/20* (2013.01); *F02C 9/18* (2013.01); *F04D 29/161* (2013.01); *F04D 29/403* (2013.01); *H05B 3/0014* (2013.01); *F05D 2220/323* (2013.01); *F05D 2240/55* (2013.01); *F05D 2260/606* (2013.01)

(58) Field of Classification Search
CPC ...... F01D 11/24; F04D 29/622; F04D 29/642; F04D 29/161; F04D 29/403; F04D 29/584
See application file for complete search history.

(56) References Cited

U.S. PATENT DOCUMENTS

| | | | |
|---|---|---|---|
| 2,994,472 | A | 8/1961 | Botje |
| 4,149,826 | A | 4/1979 | Torstenfelt |
| 4,418,537 | A | 12/1983 | Iwamoto et al. |
| 5,263,816 | A | 11/1993 | Weimer et al. |

(Continued)

FOREIGN PATENT DOCUMENTS

JP   H02223606 A   9/1990

OTHER PUBLICATIONS

Technical Information factsheet regarding Silicone Rubber Flexible Heating Blankets from Michaels Enterprises Inc., available online at https://www.michaelsenterprises.com/technical-information.html (last accessed Feb. 16, 2021).

(Continued)

*Primary Examiner* — Todd E Manahan
*Assistant Examiner* — Thuyhang N Nguyen
(74) *Attorney, Agent, or Firm* — Katherine Koenig; Koenig IP Works, PLLC (57) ABSTRACT

A small gas turbine engine, such as is used to power a UAV, that includes at least one centrifugal compressor having an impeller with blades that form a gap between the blade tips and stationary shroud of the gas turbine engine, and where a resistance heating element is secured to or bonded to a compressor casing of the gas turbine engine in order to use heat to control the gap between the impeller blades and the stationary shroud. The resistance heating element is activated at cruise mode to move the shroud toward the impeller. Additionally or alternatively, the compressor casing is heated with bled-off compressed air to move the shroud toward the impeller. A capacitance tip clearance sensor can be mounted on the impeller shroud to monitor and control tip clearance in real time.

20 Claims, 5 Drawing Sheets

(56) References Cited

U.S. PATENT DOCUMENTS

| | | | |
|---|---|---|---|
| 5,667,358 A * | 9/1997 | Gaul | F01D 11/24 |
| | | | 415/173.1 |
| 6,273,671 B1 * | 8/2001 | Ress, Jr. | F01D 5/043 |
| | | | 415/1 |
| 6,692,222 B2 | 2/2004 | Prinz et al. | |
| 7,018,165 B2 | 3/2006 | Milazar | |
| 7,824,151 B2 | 11/2010 | Schwarz et al. | |
| 7,909,566 B1 | 3/2011 | Brostmeyer | |
| 8,047,765 B2 | 11/2011 | Wilson et al. | |
| 8,087,880 B2 | 1/2012 | Karafillis et al. | |
| 10,113,556 B2 * | 10/2018 | Moniz | F04D 29/4206 |
| 10,760,444 B2 * | 9/2020 | Terwilliger | F01D 11/24 |
| 10,947,993 B2 * | 3/2021 | Shinde | F01D 25/10 |
| 2013/0251500 A1 * | 9/2013 | Cheung | F01D 11/24 |
| | | | 415/1 |
| 2015/0107261 A1 | 4/2015 | Moes et al. | |

OTHER PUBLICATIONS

Machine translation into English of JP H02223606 to Imanari, published Sep. 6, 1990).

\* cited by examiner

GAS TURBINE ENGINE WITH ACTIVE CLEARANCE CONTROL

CROSS-REFERENCE TO RELATED APPLICATIONS

N/A.

GOVERNMENT RIGHTS STATEMENT

N/A.

FIELD

The present technology is related generally to a gas turbine engine, and more specifically to an aero gas turbine engine with clearance control and a method for improving tip clearance for a centrifugal compressor in a gas turbine engine.

BACKGROUND

Maintaining a small tip clearance is critical to achieving high efficiency for centrifugal compressors, including centrifugal compressors of small gas turbine engines used as power plants for unmanned aerial vehicles (UAVs). Part tolerances, assembly stack-ups, bearing clearances, maneuver deflections, and compressor surge all come into play when setting tip clearance. As such, actual tip clearance of a centrifugal compressor when in use is typically less than ideal.

It is desirable to introduce methods to reduce tip clearance when operating at cruise conditions where efficiency is critical to flight vehicle fuel burn and range; however, currently known solutions have failed to provide a cost-effective solution of reduced complexity.

Numerous systems and methods have been described in which a tip shroud surrounding the impeller of the centrifugal compressor is displaced relative to the impeller. For example, one currently known system includes a multi-element tip shroud with articulating seals that translate relative to the impeller to effect tip clearance, with the seal elements being translated by a mechanical, pneumatic, or thermal biasing mechanism. Another currently known system includes a moveable impeller tip shroud displaced by a thermally actuated wedge-shaped ring. Yet another currently known system includes a moveable impeller tip shroud displaced by an electromagnetic actuator. Other systems and methods have been proposed wherein the impeller tip shroud is displaced by mechanical linkages, cams, and the like. However, as noted above, all of these systems and methods add complexity over a simple fixed impeller tip shroud arrangement. In doing so, they introduce unacceptable risks including wear, lockup, shroud instability, actuator reliability issues, fail-safe operation, and the like into the engine design. Further, such known systems embed the elements within the engine casing structure which makes maintenance unachievable on an installed engine. As a result, such schemes have not progressed to a production design. A simple, low-cost means for reducing impeller blade tip clearance has been lacking.

SUMMARY

Some embodiments advantageously provide devices, systems, and methods for improving tip clearance for a centrifugal compressor in a gas turbine engine, such as a small gas turbine engine used in unmanned aerial vehicles (UAVs) or other aircraft. The present disclosure applies to any of the types of gas turbines utilizing a centrifugal compressor, including, but not limited to, turbojets, turbofans, turboshafts, and turbo-alternators. In some embodiments, the present disclosure can be applied to single centrifugal compressors and/or dual centrifugal compressors. In some embodiments, tip clearance is controlled actively based on a flight condition for a flight propulsion turbine engine or on a load for a ground-based turbine engine.

In one embodiment, a gas turbine engine comprises: a compressor section, the compressor section including: a compressor having an impeller with a plurality of rotating blades; a stationary compressor casing, the compressor being at least partially within the stationary compressor casing; a stationary shroud secured to the stationary compressor casing, at least a portion of the impeller being within the stationary shroud such that a gap is formed between the stationary shroud and at least a portion of each of the plurality of rotating blades; and a resistance heating element on an outer surface of the stationary compressor casing; and a source of electrical power connected to the resistance heating element, the resistance heating element being configured to increase a temperature of the stationary compressor casing to increase an axial length of the stationary compressor casing to reduce the gap between the stationary shroud and at least a portion of each of the plurality of rotating blades.

In one aspect of the embodiment, the stationary compressor casing is at least partially composed of aluminum.

In one aspect of the embodiment, the stationary shroud is secured to the stationary compressor casing forward of and proximate the compressor, such that an increase in the axial length of the stationary compressor casing moves the stationary shroud in an aft direction toward the plurality of rotating blades.

In one aspect of the embodiment, a first end of the stationary shroud is fixedly coupled to the stationary compressor casing and a second end of the stationary shroud is slidably engageable with the stationary compressor.

In one aspect of the embodiment, the compressor is a first compressor, the gas turbine engine further comprising a second compressor downstream of the first compressor. In one aspect of the embodiment, the stationary shroud is a first stationary shroud, the gas turbine engine further comprising a second stationary shroud downstream of the first stationary shroud, the increase in the axial length of the stationary compressor casing moving the second stationary shroud in an aft direction toward a plurality of rotating blades of the second compressor.

In one aspect of the embodiment, the gas turbine engine further comprises: a tip clearance sensor secured to the stationary shroud; and a tip clearance controller in communication with the tip clearance sensor, the tip clearance controller being configured to receive a signal from the tip clearance sensor to adjust the source of electrical power to regulate a temperature of the resistance heating element based on the received signal.

In one aspect of the embodiment, the resistance heating element is a resistance heating blanket.

In one aspect of the embodiment, the resistance heating element includes at least one etched foil heating element bonded to an outer surface of the stationary compressor casing.

In one embodiment, a gas turbine engine for an aircraft comprises: a compressor configured to compress air, the compressor including an impeller having a plurality of blades; a stationary compressor casing, at least a portion of the compressor being within the stationary compressor casing; a stationary shroud coupled to the stationary compressor casing and extending around at least a portion of the impeller of the compressor, a gap being formed between the plurality of blades and the stationary shroud; a combustor configured to burn a fuel with compressed air from the compressor to produce a hot gas flow; a turbine configured to pass the hot gas flow and drive the compressor and a fan of the aircraft; a resistance heating element in contact with the stationary compressor casing at a location upstream of the centrifugal compressor; and a source of electrical power to the resistance heating element to control a temperature of the resistance heating element, the resistance heating element being configured such that an increase in temperature of the resistance heating element increases an axial length of the stationary compressor casing and reduces a gap between the stationary shroud and the plurality of blades of the compressor.

In one aspect of the embodiment, the gas turbine engine for an aircraft further comprises: a bypass flow path; and a core flow path, the core flow path passing through the compressor and the combustor.

In one aspect of the embodiment, the gas turbine engine for an aircraft further comprises: a tip clearance sensor secured to the stationary shroud; and a tip clearance controller in communication with the tip clearance sensor, the tip clearance controller being configured to receive a signal from the tip clearance sensor to adjust the source of electrical power to regulate a temperature of the resistance heating element based on the received signal.

In one aspect of the embodiment, the resistance heating element is a resistance heating blanket.

In one aspect of the embodiment, the resistance heating element includes at least one etched foil heating element bonded to an outer surface of the stationary compressor casing.

In one aspect of the embodiment, the compressor is a first centrifugal compressor, the gas turbine engine further comprising a second centrifugal compressor connected in series with the first centrifugal compressor.

In one embodiment, a gas turbine engine comprises: a compressor section, the compressor section including: a compressor having an impeller with a plurality of rotating blades; a stationary compressor casing, the compressor being at least partially within the stationary compressor casing; a stationary shroud secured to the stationary compressor casing, at least a portion of the impeller being within the stationary shroud such that a gap is formed between the stationary shroud and at least a portion of each of the plurality of rotating blades; and an impingement air manifold attached to an outer surface of the stationary compressor casing, the impingement air manifold being in fluid communication with the compressor and having at least one impingement hole configured to direct hot air flow from the compressor onto the outer surface of the stationary compressor casing.

In one embodiment, a method of controlling a tip clearance in a gas turbine engine comprises increasing a temperature of a stationary compressor casing, the stationary compressor casing at least partially surrounding a centrifugal compressor, increasing the temperature of the stationary compressor casing decreasing a gap between a stationary shroud coupled to the stationary compressor casing and an impeller of the centrifugal compressor.

In one aspect of the embodiment, the step of increasing the temperature of the stationary compressor casing includes providing power to a resistance heating element, the resistance heating element being in contact with an outer surface of the stationary compressor casing.

In one aspect of the embodiment, the resistance heating element is a resistance heating blanket.

In one aspect of the embodiment, the resistance heating element includes at least one etched foil heating element bonded to the outer surface of the stationary compressor casing.

In one aspect of the embodiment, the step of increasing the temperature of the stationary compressor casing includes directing a flow of hot air from the centrifugal compressor to an outer surface of the stationary compressor casing.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Before describing in detail exemplary embodiments, it is noted that the embodiments reside primarily in combinations of apparatus components and steps related to systems and methods for controlling tip clearance for a centrifugal compressor in a gas turbine engine. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Disclosed herein are low-cost, active tip clearance control systems and methods that use an existing compressor casing structure found in turbine engines, such as small gas turbine engines used to power UAVs. UAVs are commonly used for surveillance and reconnaissance, and therefore may be required to operate for long periods of time and in several different flight modes, such as a dash mode (for example, for rapid acceleration), cruise mode (for example, for fuel-efficient flight over long distances), and loiter mode (for example, for hovering or maintaining location over long periods of time), as well as be capable of quick movement such as takeoff or escape from other aircraft or ground fire. Such gas turbine engines must operate as efficiently as possible, and maintaining a small clearance between tips of compressor blades and a stationary shroud surrounding the compressor is critical for achieving high efficiency for compressors, such as centrifugal compressors. Systems and methods for improving tip clearance (that is, reducing a gap or space between compressor blade tips and surrounding stationary shroud) are disclosed herein.

Figure 1:
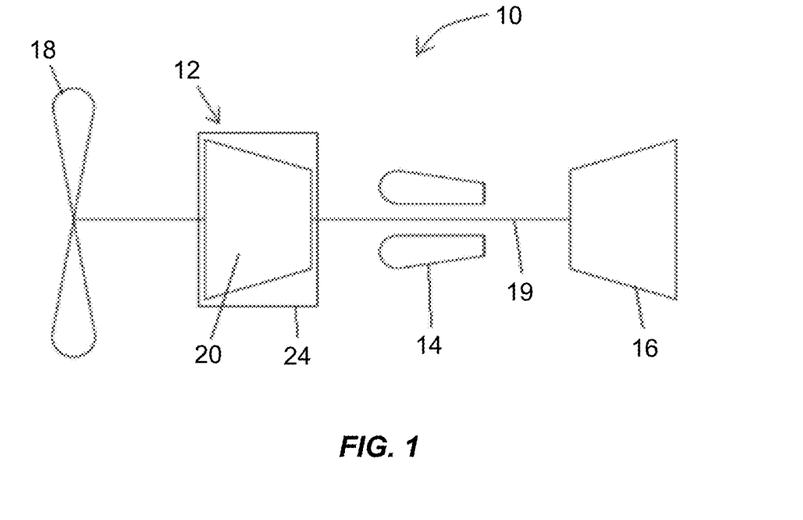
FIG. 1 shows a schematic view of a first exemplary gas turbine engine.
Figure 2:
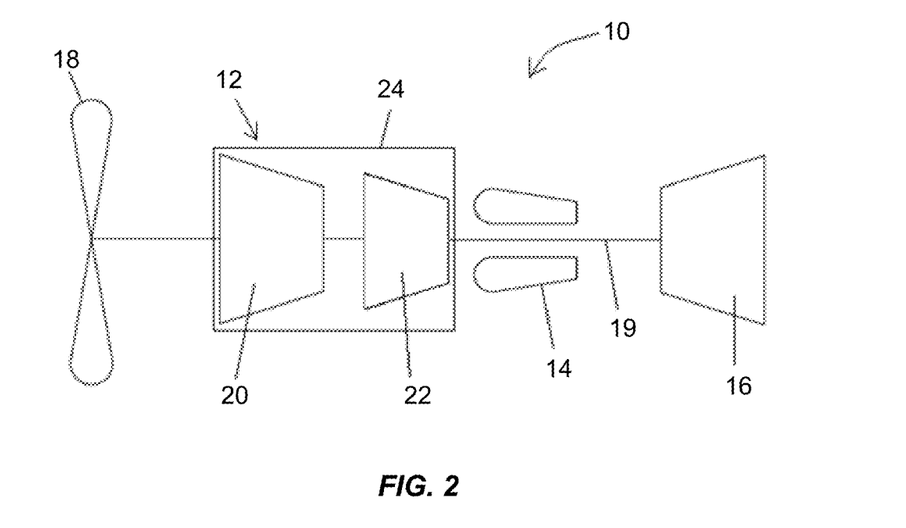
FIG. 2 shows a schematic view of a second exemplary gas turbine engine.
Figure 3:
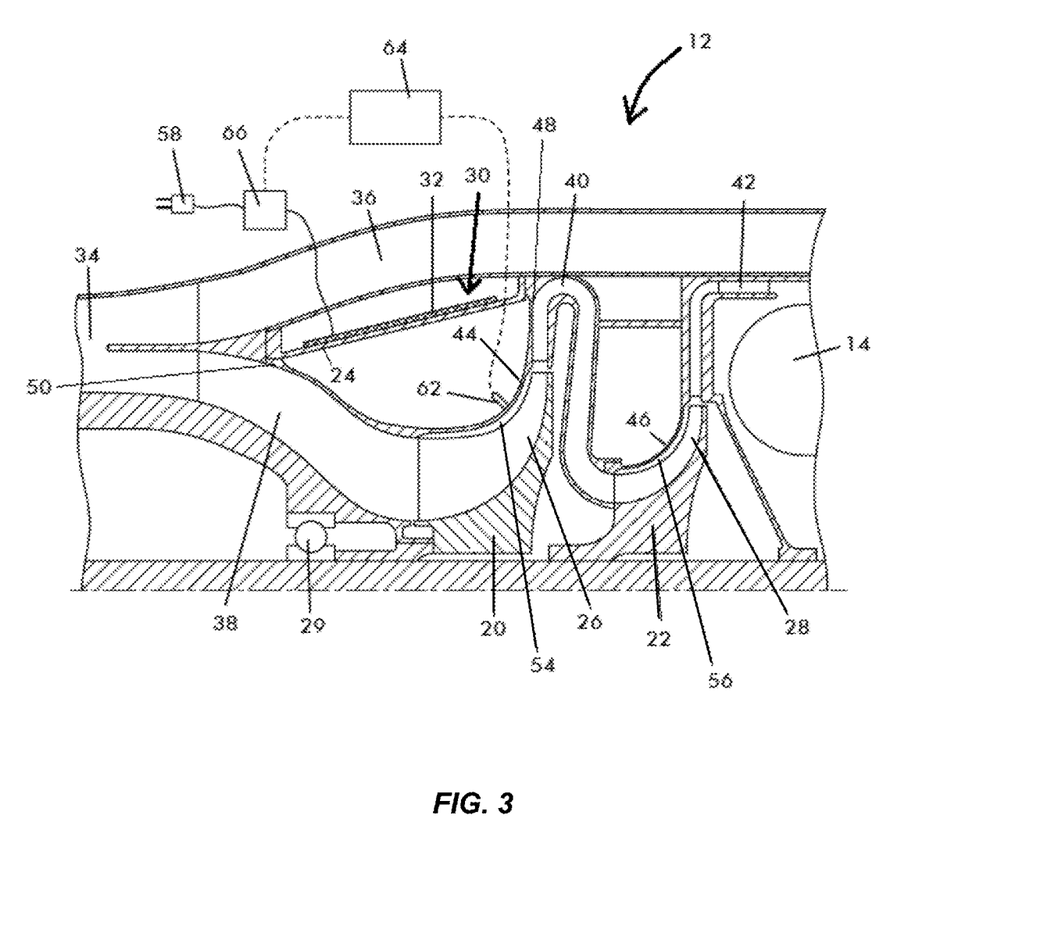
FIG. 3 shows a cross-section view of a compressor section of an exemplary gas turbine engine with first and second stage centrifugal compressors and an active tip clearance control system including a resistance heating blanket secured to a compressor casing to control tip clearances, in accordance with the present disclosure.

Referring now to FIGS. 1 and 2, schematic views of gas turbines are shown as non-limiting examples of a gas turbine engine in which the presently disclosed systems and methods may be used. In some embodiments, the gas turbine engine 10 is a turbofan engine that generally includes a compressor section 12, a combustor 14 configured to burn fuel with compressed air from the compressor section 12 to produce a hot gas flow, and a turbine 16 through which the hot gas flow is passed and which drives a fan 18. In some embodiments, the turbine 16 drives both the compressor section 12 and the fan 18 through a shaft 19. In one embodiment, the compressor section 12 includes a single compressor 20 (for example, as shown in FIG. 1). In another embodiment, the compressor section 12 includes a first stage compressor 20 and a second stage compressor 22 that are connected in series with the first stage compressor 20 being upstream of the second stage compressor 22 (for example, as shown in FIG. 2). The compressor(s) 20, 22 may be centrifugal compressors. In some embodiments, the compressor(s) 20, 22 are at least partially contained within a stationary compressor casing 24. Each compressor 20, 22 includes an impeller with a plurality of rotating blades 26, 28, respectively (shown in FIG. 3). The compressor(s) 20, 22 are supported by at least one bearing 29, such as a thrust bearing (shown in FIG. 3). Additionally, in some embodiments the gas turbine engine also includes a resistance heating element 30 (shown and described in FIGS. 3-5), as well as one or more fluid flow paths, shrouds, and other components (such as are shown in FIG. 3). Further, it will be understood that the compressor section 12 may include more or fewer compressors shown and such compressors may include centrifugal compressors and/or other compressor types, and the gas turbine engine include additional components not shown in the figures.

Figure 4:
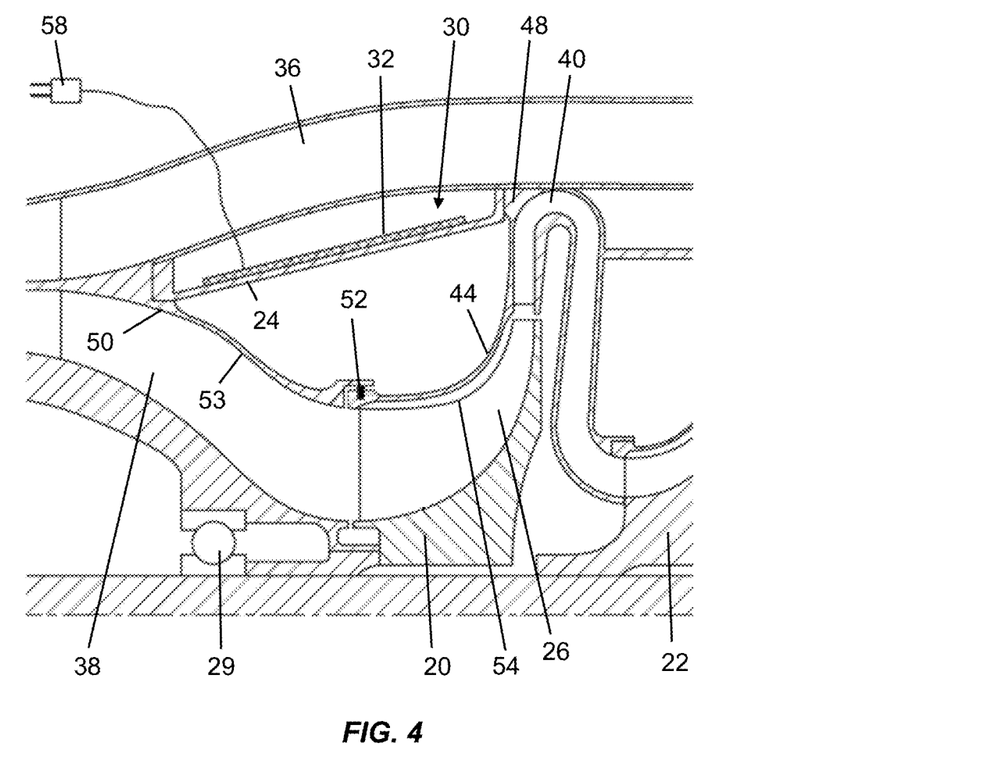
FIG. 4 shows a cross-section view of a compressor section of an exemplary gas turbine engine with first and second stage centrifugal compressors, as shown in FIG. 3, and having a shroud forward interface, in accordance with the present disclosure.
Figure 5:
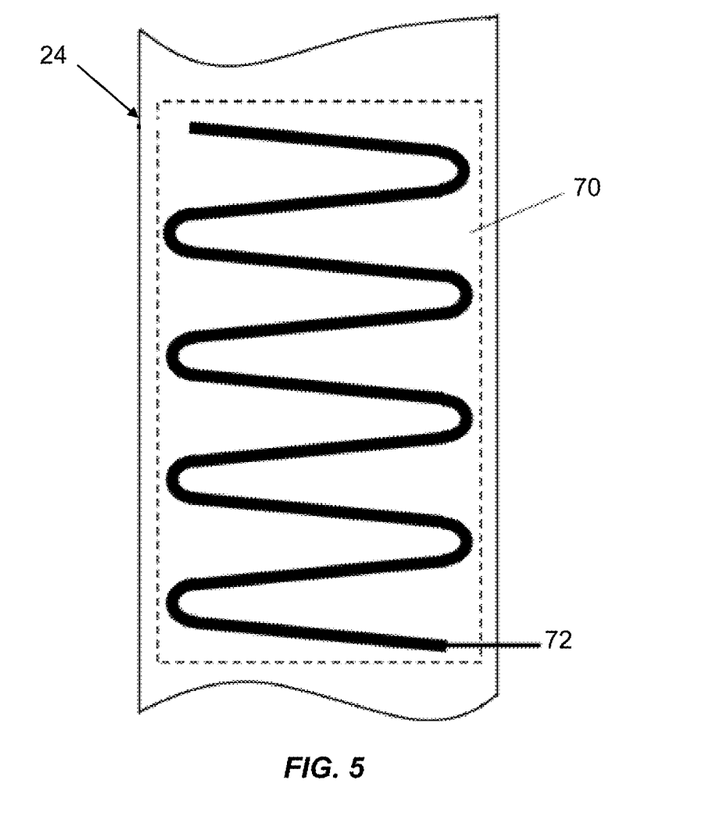
FIG. 5 shows a top-down flat pattern view of a compressor casing with an etched foil heating element on an outer surface, in accordance with the present disclosure.

Referring now to FIGS. 3-5, a compressor casing may be heated by the application of heating from a resistance heating element. FIG. 3 shows a first system wherein resistance heating is applied using a resistance heating blanket secured to an exterior of the compressor casing as the resistance heating element, FIG. 4 shows an exemplary embodiment of the system of FIG. 3 and having a shroud forward interface, and FIG. 5 shows a second system wherein resistance heating is applied using one or more etched foil heating elements bonded to the outer wall of an outer compressor casing or embedded in channels formed in an outer wall of the compressor casing as the resistance heating element.

Referring now to FIG. 3 in more detail, a cross-section view of a compressor section 12 of an exemplary gas turbine engine 10 is shown, wherein heating of a compressor casing 24 is achieved using a resistance heating blanket 32 as the resistance heating element 30. In one embodiment, the gas turbine engine 10 is a turbofan engine. In one embodiment, the gas turbine engine includes a first stage compressor 20 and a second stage compressor 22 that are at least partially contained within a stationary compressor casing 24 and that are connected in series flow (for example, as shown in FIG. 2). In some embodiments, the compressors 20, 22 are centrifugal compressors. Each compressor 20, 22 includes an impeller with a plurality of rotating blades 26, 28, respectively. In one embodiment, air enters a passage 34 and is then divided between a bypass channel flow 36 and a core flow 38. The core flow 38 then enters an inlet of the first stage compressor 20. Compressed air from the first stage compressor 20 flows into a turn channel 40 and then enters an inlet of the second stage compressor 22. Compressed air from the second stage compressor 22 flows through a diffuser 42 and then into a combustion chamber of a combustor 14.

Continuing to refer to FIG. 3, and with reference to FIG. 4, in one embodiment the blades 26 of the first stage compressor 20 are at least partially contained within and rotate within a stationary first shroud 44 (which may also be referred to as a first impeller shroud) and the blades 28 of the second stage compressor 22 are at least partially contained within and rotate within a stationary second shroud 46 (which may also be referred to as a second impeller shroud). An aft or first end 48 of the first shroud 44 is hard mounted to (that is, fixedly connected to or integrated with) the aft end of the compressor casing 24 and a forward or second end 50 of the first shroud 44 has a sliding fit with (that is, is slidably engageable with) the forward end of the compressor casing 24. In one embodiment, the sliding fit is established with a small radial clearance at the mating interface. In one embodiment (for example, as shown in FIG. 4), a piston ring seal 52 is mounted in the first shroud 44 and allowed to slide against a second element 53 formed as an extension of an inlet frame, thus providing sealed sliding surface. In one non-limiting example, as shown in FIG. 4, the second element 53 defines or includes a circumferential lip that is configured to extend around and external to the piston ring seal 52. When heat is applied to the compressor casing 24, the axial length of the compressor casing 24 is increased. In one embodiment, the blades 26 of the impeller of the first stage compressor 20 are located proximate a thrust bearing 29, and any increase in axial length of the compressor casing 24 moves the first shroud 44 aft in the direction of the blades 26 of the impeller of the first stage compressor 20, thereby reducing the tip clearance. That is, a gap 54 or distance between the blades 26 of the first stage compressor 20 and the first shroud 44 is reduced. For a twin centrifugal compressor as shown in FIGS. 2 and 3, heating the compressor casing 24 and the resulting increase in compressor casing axial length will also reduce the tip clearance at the second stage compressor 22. That is, a gap 56 between the blades 28 of the second stage compressor 22 and the second shroud 46 is reduced. Although not shown in FIG. 4, in some embodiments the gas turbine engine 10 includes components shown in FIG. 3, such as the capacitance tip clearance sensor 62, tip clearance controller 64, and electrical regulator 66.

Continuing to refer to FIG. 3, in one embodiment the resistance heating blanket 32 is attached or affixed to at least a portion of an outer surface of the compressor casing 24. In one non-limiting example, the resistance heating blanket 32 wraps around the entire circumference of the compressor casing 24. In one non-limiting example, the resistance heating blanket 32 is bonded to the outer surface of the compressor casing 24, such as by adhesive, chemical bonding, welding, or the like. Additionally or alternatively, the resistance heating blanket 32 is friction fit or mechanically coupled to the outer surface of the compressor casing 24, such as with retainer straps. In one embodiment, the resistance heating blanket 32 is secured to the compressor casing 24 forward or ahead of (upstream of) the first stage compressor 20. The resistance heating blanket 32 is wired to an electrical power source 58 that is configured to apply current to the resistance heating blanket 32 to regulate a temperature of a portion the resistance thermal blanket 32 that is in contact with the compressor casing 24. In one embodiment, the resistance heating blanket 32 is of an electrical resistance type and the electrical power source 58 is energized either by the gas turbine engine 10 or vehicle power control module once the gas turbine engine 10 has thermally stabilized or the vehicle has reached a cruise condition (cruise mode). In one embodiment, lead wires are routed to the exterior of the gas turbine engine and are in electrical communication with the gas turbine engine's electrical harness. In one non-limiting example, the resistance heating blanket 32 is constructed from copper-nickel and nickel-chrome alloy wire wound around a Kevlar® (E. I. du Pont de Nemours and Company, Wilmington, Del.) thread core sandwiched between layers of fiberglass reinforced silicone rubber that can withstand temperatures up to 450° F. In one exemplary method of use, the resistance heating blanket 32 is activated automatically or semi-automatically during cruise mode to move the shrouds 44, 46 toward the blades 26, 28. Power to the resistance heating element (here, the resistance heating blanket 32) is controlled to a level that allows the compressor casing 24 to achieve a predetermined increase in temperature. As the temperature of the compressor casing 24 increases, the axial length of the compressor casing 24 also increases and, consequently, the two gaps 54, 56 are reduced and the leakage path across the compressor blades 26, 28 decreases.

In all embodiments of the active tip clearance control systems disclosed herein, and as shown in FIG. 3, a capacitance tip clearance sensor 62 may optionally be included to monitor tip clearance in real time. In one embodiment, the capacitance tip clearance sensor 62 is affixed to, coupled to, or integrated with an impeller shroud (for example, the first shroud 44 and/or the second shroud 46). A non-limiting example is shown in FIG. 3, in which the capacitance tip clearance sensor 62 is affixed to the first shroud 44. In some embodiments, the capacitance tip clearance sensor 62 is in wired or wireless communication with, and is configured to send signals to, a tip clearance controller 64. The tip clearance controller 64 is in wired or wireless communication with an electrical regulator 66 that is configured to control power to the resistance heating element 30 (for example, the resistance heating blanket 32) and regulate the temperature thereof for control of the tip clearance. With such a system, tip clearance of the blades 26, 28 can be optimized during climb, cruise, and descent by varying power to the resistance heating elements 30 (for example, the resistance heating blanket 32 and/or etched foil heating elements) or the volume of hot air flow to the outer surface of the compressor casing 24 (for example, as discussed below and shown in FIG. 6) to maintain an optimum tip clearance throughout the flight cycle.

Referring now to FIG. 5 in more detail, a top-down flat pattern view of a compressor casing 24 of an exemplary gas turbine engine is shown, wherein heating of a compressor casing 24 is achieved using, as the resistance heating element 30, one or more etched foil heating elements 70 affixed to the outer surface of the compressor casing 24. In one embodiment, the etched foil heating elements 70 are bonded to the outer surface of the compressor casing 24. In one non-limiting example, the etched foil heating elements 70 are each constructed from an electrically conductive polyimide film such as Kapton® (E. I. du Pont de Nemours and Company, Wilmington, Del.) that can withstand temperature of up to 450° F. and include at least one etching 72.

Figure 6:
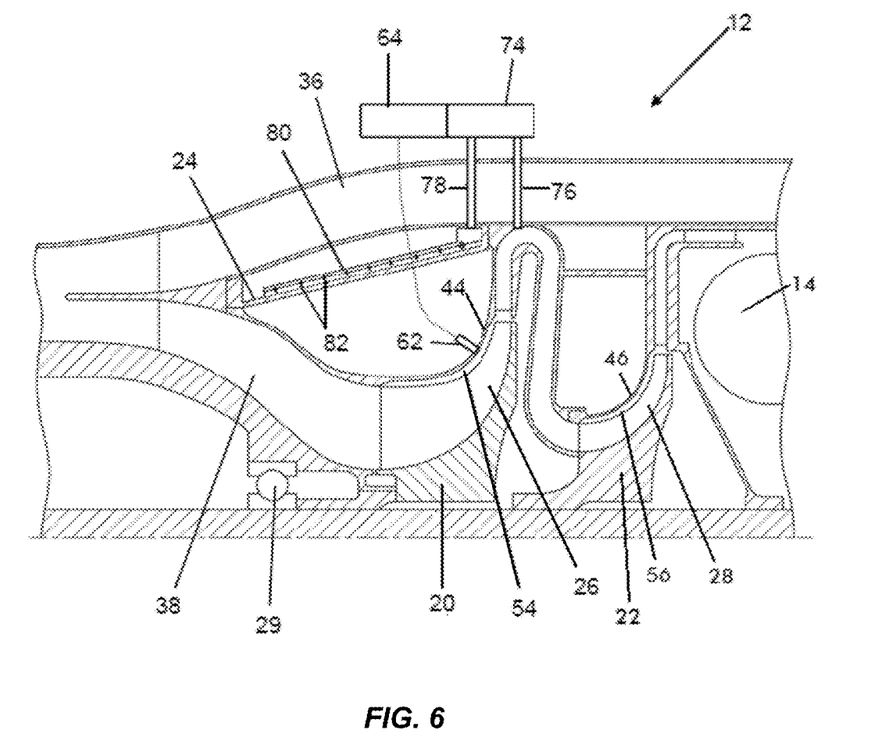
FIG. 6 shows a schematic view of a compressor section of an exemplary gas turbine engine and a tip clearance control system, wherein hot air bled off the compressor section and passed onto an outer surface of a compressor casing to control tip clearances, in accordance with the present disclosure.

Referring now to FIG. 6, a compressor casing may be heated by the passage of hot air over an outer surface of the compressor casing. In one embodiment, the gas turbine engine 10 of the schematic view of FIG. 6 is substantially the same as the gas turbine engine of FIGS. 2-5, and like reference numbers are used to identify like elements. In some embodiments, the gas turbine engine of FIG. 6 includes a single compressor 20 (for example, as shown in FIG. 1).

Continuing to refer to FIG. 6, in one embodiment hot air from the first stage compressor 20 and/or the second stage compressor 22 is bled off downstream of the first stage compressor 20 and/or the second stage compressor 22 and is redirected onto an outer surface of the compressor casing 24. In one non-limiting example, the hot air is bled off downstream of the first stage compressor 20 (that is, from between the first and second stage compressors). In one exemplary method of use, a control valve 74 managed by the tip clearance controller 64 is actuated automatically or semi-automatically to direct hot air flow from the first stage compressor 20 and/or the second stage compressor 22 once the gas turbine engine 10 has thermally stabilized or the vehicle has reached a cruise condition. In one embodiment, hot air flow from the first stage compressor 20 passes through an offtake tube 76, through the control valve 74, then through an impingement air supply tube 78. From the impingement air supply tube 78, hot air passes into an impingement air manifold 80 fastened or attached to the exterior of the compressor casing 24. At least one impingement hole 82 on the underside of the impingement air manifold 80 direct hot air onto the outer wall of the compressor casing 24. The compressor 20 is in fluid communication with the impingement air manifold 80. Hot air flow is thus controlled to a level that allows the compressor casing 24 to achieve a predetermined increase in temperature.

Using currently known tip clearance control schemes, an approximately 0.010 inch running tip clearance may typically be achieved at a cruise condition. In contrast, the low-cost active tip clearance control system disclosed herein may reduce the tip clearance to approximately 0.005 inch at the cruise condition. For example, an aluminum compressor casing 24 with a length of four inches that is heated to approximately 100° F. above its nominal steady state temperature would see an approximately 0.005 inch increase in its axial length. This increase in compressor casing length directly results in an approximately 0.005 inch reduction in impeller blade tip clearance for a cylindrical or shallow conical casing.

In additional to these benefits, the tip clearance control systems disclosed herein are, in some embodiments, readily accessible on-wing if maintenance is required. The system is also failsafe since the system defaults to the open condition during a failure (for example, if power or hot air were interrupted).

In one embodiment, a gas turbine engine for an aircraft comprises: a compressor to compress air; a combustor to burn a fuel with compressed air from the compressor to produce a hot gas flow; a gas turbine to pass the hot gas flow and drive the compressor and a fan of the aircraft; the engine having a bypass flow and a core flow; the compressor being a centrifugal type compressor with a gap formed between a centrifugal blade and a stationary shroud of the engine; a thermal blanket secured to the stationary casing ahead of the centrifugal compressor; and a source of electrical power to the thermal blanket to control a temperature of the thermal blanket and thus a gap between the stationary shroud and the blade of the centrifugal compressor.

In one aspect of the embodiment, the gas turbine engine for an aircraft further comprises: a capacitance tip clearance sensor secured to the stationary shroud; and a tip clearance controller, the tip clearance controller receiving a signal from the capacitance tip clearance sensor to regulate a temperature of the thermal blanket and control the gap size.

In one aspect of the embodiment, the compressor includes a first centrifugal compressor and a second centrifugal compressor in a series flow.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention.

What is claimed is:

1. A gas turbine engine, the gas turbine engine comprising:
   a compressor section, the compressor section including:
      a compressor having an impeller with a plurality of rotating blades;
      a stationary compressor casing, the compressor being at least partially within the stationary compressor casing;
      a stationary shroud secured to the stationary compressor casing, at least a portion of the impeller being within the stationary shroud such that a gap is formed between the stationary shroud and at least a portion of each of the plurality of rotating blades; and
      a resistance heating element on an outer surface of the stationary compressor casing; and
   a source of electrical power connected to the resistance heating element, the resistance heating element being configured to increase a temperature of the stationary compressor casing to increase an axial length of the stationary compressor casing to reduce the gap between the stationary shroud and at least a portion of each of the plurality of rotating blades.

2. The gas turbine engine of claim 1, wherein the stationary compressor casing is at least partially composed of aluminum.

3. The gas turbine engine of claim 1, wherein the stationary shroud is secured to the stationary compressor casing forward of and proximate the compressor, such that an increase in the axial length of the stationary compressor casing moves the stationary shroud in an aft direction toward the plurality of rotating blades.

4. The gas turbine engine of claim 3, wherein a first end of the stationary shroud is fixedly coupled to the stationary compressor casing and a second end of the stationary shroud is slidably engageable with the stationary compressor casing.

5. The gas turbine engine of claim 3, wherein the compressor is a first compressor, the gas turbine engine further comprising a second compressor downstream of the first compressor.

6. The gas turbine engine of claim 5, wherein the stationary shroud is a first stationary shroud, the gas turbine engine further comprising a second stationary shroud downstream of the first stationary shroud, the increase in the axial length of the stationary compressor casing moving the second stationary shroud in an aft direction toward a plurality of rotating blades of the second compressor.

7. The gas turbine engine of claim 1, further comprising:
   a tip clearance sensor secured to the stationary shroud; and
   a tip clearance controller in communication with the tip clearance sensor, the tip clearance controller being configured to receive a signal from the tip clearance sensor to adjust the source of electrical power to regulate a temperature of the resistance heating element based on the received signal.

8. The gas turbine engine of claim 1, wherein the resistance heating element is a resistance heating blanket.

9. The gas turbine engine of claim 1, wherein the resistance heating element includes at least one etched foil heating element bonded to an outer surface of the stationary compressor casing.

10. A gas turbine engine for an aircraft comprising:
   a compressor configured to compress air, the compressor including an impeller having a plurality of blades;
   a stationary compressor casing, at least a portion of the compressor being within the stationary compressor casing;
   a stationary shroud coupled to the stationary compressor casing and extending around at least a portion of the impeller of the compressor, a gap being formed between the plurality of blades and the stationary shroud;
   a combustor configured to burn a fuel with compressed air from the compressor to produce a hot gas flow;
   a turbine configured to pass the hot gas flow and drive the compressor and a fan of the aircraft;
   a resistance heating element in contact with the stationary compressor casing at a location upstream of the compressor; and
   a source of electrical power to the resistance heating element to control a temperature of the resistance heating element, the resistance heating element being configured such that an increase in temperature of the resistance heating element increases an axial length of the stationary compressor casing and reduces a gap between the stationary shroud and the plurality of blades of the compressor.

11. The gas turbine engine for an aircraft of claim 10, further comprising:
a bypass flow path; and
a core flow path, the core flow path passing through the compressor and the combustor.

12. The gas turbine engine for an aircraft of claim 10, further comprising:
a tip clearance sensor secured to the stationary shroud; and
a tip clearance controller in communication with the tip clearance sensor, the tip clearance controller being configured to receive a signal from the tip clearance sensor to adjust the source of electrical power to regulate a temperature of the resistance heating element based on the received signal.

13. The gas turbine engine of claim 10, wherein the resistance heating element is a resistance heating blanket.

14. The gas turbine engine of claim 10, wherein the resistance heating element includes at least one etched foil heating element bonded to an outer surface of the stationary compressor casing.

15. The gas turbine engine for an aircraft of claim 10, wherein the compressor is a first centrifugal compressor, the gas turbine engine further comprising a second centrifugal compressor connected in series with the first centrifugal compressor.

16. A method of controlling a tip clearance in a gas turbine engine, the method comprising increasing a temperature of a stationary compressor casing, the stationary compressor casing at least partially surrounding a compressor, increasing the temperature of the stationary compressor casing increasing an axial length of the stationary compressor casing and decreasing a gap between a stationary shroud coupled to the stationary compressor casing and an impeller of the compressor, wherein the step of increasing the temperature of the stationary compressor casing includes providing electrical power to a heating element, the heating element being in contact with an outer surface of the stationary compressor casing, such that an increase in temperature of the heating element increases the temperature of the stationary compressor casing.

17. The method of claim 16, wherein the heating element is a resistance heating blanket.

18. The method of claim 16, wherein the heating element includes at least one etched foil heating element bonded to the outer surface of the stationary compressor casing.

19. The method of claim 16, wherein the compressor is a centrifugal compressor.

20. The method of claim 16, wherein the heating element is a resistance heating element.

* * * * *